United States Patent
Muller

[11] 3,826,146
[45] July 30, 1974

[54] METHOD AND APPARATUS FOR IMBALANCE DETERMINATION

[75] Inventor: Richard Muller, Worfelden, Germany

[73] Assignee: Gebr. Hofmann KG

[22] Filed: June 19, 1973

[21] Appl. No.: 371,500

[30] Foreign Application Priority Data
July 28, 1972 Germany.............................. 2237171

[52] U.S. Cl. ................................................. 73/462
[51] Int. Cl. ............................................ G01m 1/22
[58] Field of Search .............................. 73/462, 464

[56] References Cited
UNITED STATES PATENTS
3,623,374  11/1971  Bauer.................... 73/462
FOREIGN PATENTS OR APPLICATIONS
1,108,475  6/1961  Germany ..................... 73/462

Primary Examiner—James J. Gill
Attorney, Agent, or Firm—Cushman, Darby & Cushman

[57] ABSTRACT

An improved method and apparatus for measuring imbalance of a rotary test body whereby the imbalance vector signal generated by a conventional wheel balance machine is split into rectified components and integrated to eliminate residual waves and interference frequencies, the integration time being extended with increasing measuring time. A logic element, for example, a field effect transistor, connected between the vector splitting circuit and integrator is alternately rendered conductive and non-conductive with the times of non-conductive increasing with respect to the times of conduction with increases in time.

7 Claims, 5 Drawing Figures

METHOD AND APPARATUS FOR IMBALANCE DETERMINATION

The invention refers to a method and apparatus for determining the imbalance of a rotary test body such as a automobile tire, both as to the amount of imbalance and the phase position of imbalance.

One conventional technique now in use involves splitting up the imbalance vector of an electrical signal conventionally derived from a wheel balancing machine into rectified voltage components and eliminating residual waves or interference frequencies from the D.C. component by subsequent integration, the integration time being extended with increasing measuring time.

A conventional device for carrying out this technique detects the amount of imbalance and phase of a test body rotating on a balancing machine with an integrator connected to the imbalance signal generating structure for splitting up the imbalance vector into components.

Balancing machines are known in which the imbalance vibrations are picked up by electromechanical transducers. In this type of device, the alternating voltage signal produced by the transducer (amplified if necessary) is usually fed into two multiplication circuits, one multiplying the transducer voltage by a sine-wave voltage revolving in locked phase relation to the balancing spindle, and the other multiplying the transducer voltage by a second phase transmitter voltage shifted by 90° relative to the first phase transmitter voltage so that from the following integration of the two direct current voltages detected, direct current voltages will result corresponding to the $x$ and $y$ imbalance components and being free from interference voltages.

German patent, 1,108,475, discloses a measuring device for balancing machines using controlled rectifiers to form the components and by means of vectorial addition subsequently to transform the components into a voltage again corresponding to the imbalance vector. For this purpose, the d.c. voltages of the components are applied across a contact to a capacitor connected to the input of a high-resistance impedance transducer, for instance a vacuum tube or a field-effect transistor, in order that, after opening the contact at its output, the component voltage detected will be retained even after stoppage of the machine.

From the German patent, 2,012,685, it is also known how to determine the imbalance components by means of eliminating interference frequencies and harmonics by an additional filter. Integration of the component voltages is effected by two integrators with infinite d.c. amplification. From the German patent, 2,012,685, it is further known how to extend the integration time with increasing measuring time. This is achieved by altering the degree of amplification of the amplifier integrated before the controlled rectifier. There is the disadvantage, however, that complex circuitry is necessary to obtain a short measuring time and to eliminate interference frequencies.

The object of this invention is to achieve a shorter measuring time with simpler circuitry and to eliminate interferences of the component d.c. voltages. To solve this problem according to the invention with reference to a method as mentioned above, it is proposed to fix the integration time by means of a logic element in such a way that at the beginning of a measuring run, the switching contact of the logic element is kept closed for several runs and the times of opening as compared with the times closed are extended as the measuring time increases.

The goal is carried out according to the invention in that control means are provided to keep the contact of the logic element closed for several runs and to open and close at a considerably higher frequency than that of the speed of the machine while the opening time of the contact relative to the time closed increases with increasing measuring time.

Up-to-date balancing machines normally incorporate an electronic storage system which is so adapted that the component d.c. voltages detected are applied to capacitors which are connected to the input of high impedance amplifiers. When disconnecting the charged capacitors from the component d.c. voltages, the values measured are still available even if the machine has been stopped. The storage capacitors are loaded by means of resistors.

In the present invention, these storage capacitors, together with the resistors, can be used as integrators to eliminate interference. It has been found that elimination of interferences is successful if the time constant of the integrator is sufficiently high.

According to the invention, a logic element is provided by means of which the time constant of the integrator is increased with increasing measuring time. At the beginning of a measuring run, the time constant of the integrator is short enough so that after a few runs of the balancing machine the capacitor is already charged up to the full value of the component d.c. voltage. The voltage of the capacitor, however, then varies with the rhythm of speed or twice the speed as well as with the rhythm of the interference frequencies of the frequency spectrum. The percentage of interference frequencies is often considerable particularly in fully automatic balancing machines, since during the measuring operation there are other motions from the transfer system or the processing machines occasionally transmitting vibrations to the measuring device.

In carrying out the procedure according to the invention, the component voltage reaches its approximate value after several runs of the balancing machine. During the following measuring runs, the contact of the logic element is opened and closed at a considerably higher frequency than that of the balancing machine speed. In this way the capacitor can only be charged or changed over through the resistor to a medium current smaller than would be the case if the resistor were continuously connected.

A shortening of the switch-on time may be performed during the measuring runs until complete disconnection of the resistor is effected. Thus, the measuring device commencing with the start time of the measuring run is variable from a short integration time to an infinite one, i.e. until maximum elimination of inteference and absolute storage of the measuring results are achieved.

The invention, therefore, comprises a procedure and device in which modules already incorporated in the imbalance measuring device are being used for shortening the measuring time and eliminating interferences in the imbalance components.

In the invention, relays or field-effect transistors may be used as logic elements. A pulse width modulator as is known for instance from the book *ELECTRONIC ANALOG AND HYBRID COMPUTERS* by Korn & Korn (pages 268 – 275) is suitable as a control device in particular for the field-effect transistors acting as logic elements. With the on-command signal, this pulse width modulator may, for example, be connected to a charged capacitor discharging with a predetermined time constant. For this purpose, the capacitor should be charged to a higher voltage than the pulse width modulator permits, with the consequence that during several rotations of the machine, the pulse width modulator will supply an output voltage keeping the resistor continuously connected. Only after the fall-off of the capacitor voltage controlling the pulse width modulator is the pulse duty factor shortened when the maximum input voltage of the pulse width modulator is reached, thus effecting extension of the measuring time by means of an e-function. This can be continued to such an extent that also the minimum limit of modulability of the pulse width modulator will be covered effecting complete storage of the values measured.

This is an extremely simple way to achieve simultaneous storage of the imbalance components and considerable shortening of the measuring time as well as elimination of interference in the imbalance components.

In balancing machines already incorporating an electronic system, it is, therefore, possible apart from storage to achieve a shortening of the measuring time and elimination of interference if the logic element connected before the integration stage is controlled according to the invention. For this purpose, the pulse width modulator as already mentioned is the most suitable circuit. This pulse width modulator can be used for controlling the storage contacts of the $x$ and $y$ components as well as for the left and the right measuring planes.

It is further advantageous in balancing machines having one measuring channel selectively commutable to the left or right measuring planes, that when actuating this switch, the integration time passing from a short to a long period is re-initiated so that after commutation, the reading of the other plane will be available as quickly as at the start of the machine.

It is also advantageous when commutating a sensitivity step switch to restart the run-off of the integration time in order that the new measuring value will be available immediately after actuation of the sensitivity switch.

It is further advantageous to provide a switch to limit the integration cycle to a certain time constant in order that the plane and amount controls can be made during the usual measuring time.

Another embodiment of the invention provides for the elimination of interference of the component direct current by means of integration to such an extent that the component d.c. voltages allow only a fractional part of the absolute direct current as disturbing voltage. In addition to this integration stage, another one may be switched in line.

The resistor of the additional integration stage is characterized in that it depends on the voltage in such a way that high voltage causes low resistance and low voltage causes high resistance. This may be achieved for instance by connecting two antiparallel diodes in parallel to a resistor of high impedance.

Because of the low forward resistance, the second capacitor will then immediately be charged to an approximate value when the balancing machine is started and the component voltage is comparatively low. While the machine continues operating, the voltage difference between the first and the second capacitor will decrease more and more with the voltage of the diodes, falling under their threshold value and becoming highly resistive. In the end, only the resistor will be operative bringing about a high time constant of the second integration module. When the machine has been started, the second capacitor, therefore, will be charged comparatively quickly to its approximate final value. If the voltage once drops lower than the threshold voltage of the diodes, the second capacitor will be charged considerably more slowly and elimination of interference will be increased. This embodiment requires opening the so-called storage contact after completion of the measuring run, since otherwise the capacitor charge would go out through the resistor.

This device distinguishes itself by its efficiency. It only requires one additional capacitor, a resistor, and two diodes for each component. A pulse width modulator is not necessary; this device, however, does not incorporate such a short measuring time as the former one, since extension of the measuring time is not controlled by a time interval but by the difference in voltage of the two capacitors. The characteristics of the invention are illustrated in FIGS. 1–5.

Figure 1:
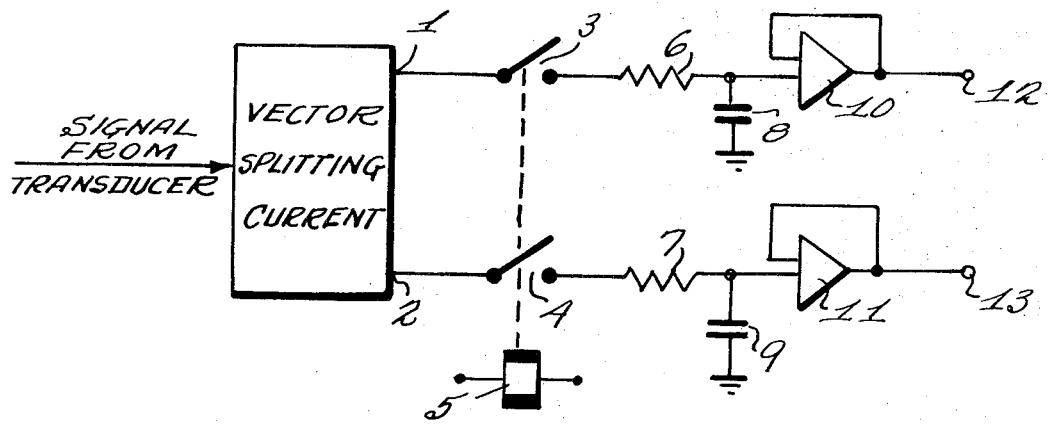
FIG. 1 shows a conventional storage circuit as used in balancing machines for the storage of the $x$ and $y$ component values.

In FIG. 1, the outputs of two multiplication circuits or of two controlled rectifiers included in the conventional vector splitting circuit are connected to the input terminals 1 and 2, for instance to 1 with respect to the $x$ component and to 2 with respect to the $y$ component. Relay contacts 3 and 4 are closed in known manner by means of a so-called storage relay 5 during rotation of the machine. Resistors 6 and 7 together with capacitors 8 and 9 serve the purpose of integration i.e. for elimination of interference in the pulsating direct current applied to input terminals 1 and 2. Capacitors 8 and 9 also serve as storage capacitors in the event relay 5 is disconnected before completion of the measuring run. Capacitors 8 and 9 are connected to highly resistive impedance transducers 10 and 11 so that the $x$ and $y$ component d.c. voltages being free of interference are available at the output terminals 12 and 13 of the impedance transducers 10 and 11 for further manipulation.

Figure 3:
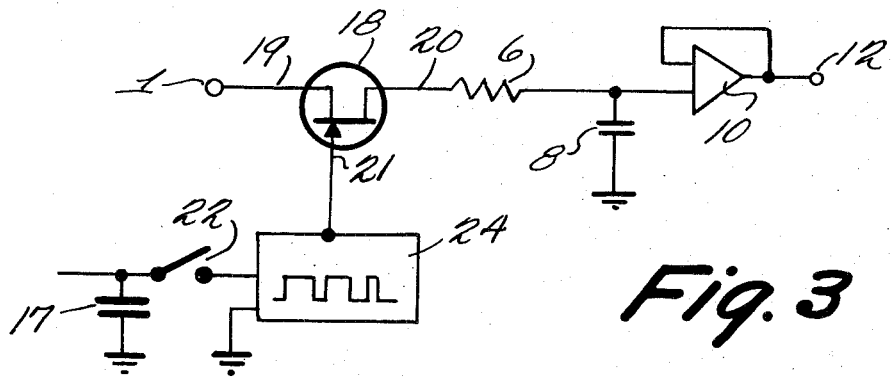
FIG. 3 shows a storage circuit of one component of this invention, using a field-effect transistor as logic element.

In FIG. 3, the storage system of this invention is illustrated for one component only, for instance for the x component, the logic element being adapted as field-effect transistor 18. The output of a multiplication circuit (not illustrated) is, for example, connected to input 1. The voltage of the multiplication circuit is fed through connections 19 and 20 of the field-effect transistor 18 and via resistor 6 into the capacitor 8. Resistor 6 together with capacitor 8 serve for elimination of interference, capacitor 8 simultaneously being used for storage.

Figure 4:
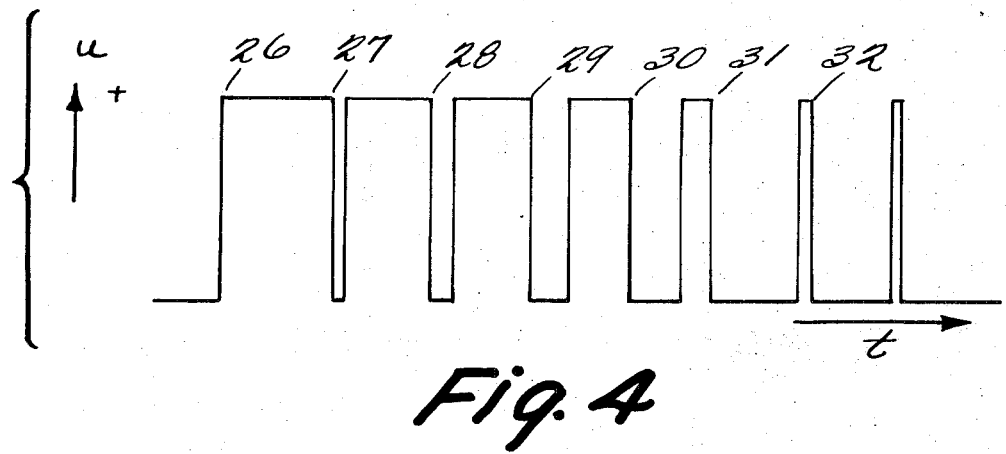
FIG. 4 shows the time slope of the voltage supplied by a pulse width modulator, as used for controlling a storage relay or a field-effect transistor according to the invention.

Impedance transducer 10 transmits the voltage stored to output terminal 12. When applying a negative voltage to gate 21 of field-effect transistor 18, the resistance of line 19-20 of the field-effect transistor 18 nearly approaches infinity so that the field-effect transistor represents an When applying a positive voltage to gate 21 of field-effect transistor 18, the contact 19 and contact 20 of field-effect transistor 18 are connected, which corresponds to a closed relay contact. During run-off of the machine, the voltage variation as shown in FIG. 4 is now applied to gate 21 of the field-effect transistor or to a polarized relay 5 in FIG. 1. On starting, a charged capacitor 17 is applied to the input of pulse width modulator 24 by means of switch 22, so that the time of starting, the voltage of the pulse width modulator 24 reaches a positive value (26 in FIG. 4). The output voltage of the pulse width modulator 24 is to remain positive during several cycles of the machine; by the drop in charge of the capacitor 17 connected to the input of the pulse width modulator, the pulse width modulator 24 will first supply small and then increasingly wider negative pulses with increasing discharge of the capacitor 17, i.e. with the time increasing until a constant negative voltage is at the input of the pulse width modulator 24 after complete discharge of capacitor 17. This output voltage is connected to the gate 21 of field-effect transistor 18 in FIG. 3 with the result that the field-effect transistor continues operating through several runs after the machine has been started. With increasing time, field-effect transistor 24 is switched off for short intervals being, however, extended more and more so that the mean charging current will decrease more and more through resistor 6, giving the result that the time constant of the integration module 6, 8 will be extended more and more.

The wave-shape traced in FIG. 4 is distorted for the purpose of a better understanding; in reality, the pulse width modulator 24 is triggered at a considerably higher frequency than that of the machine speed.

Figure 2:
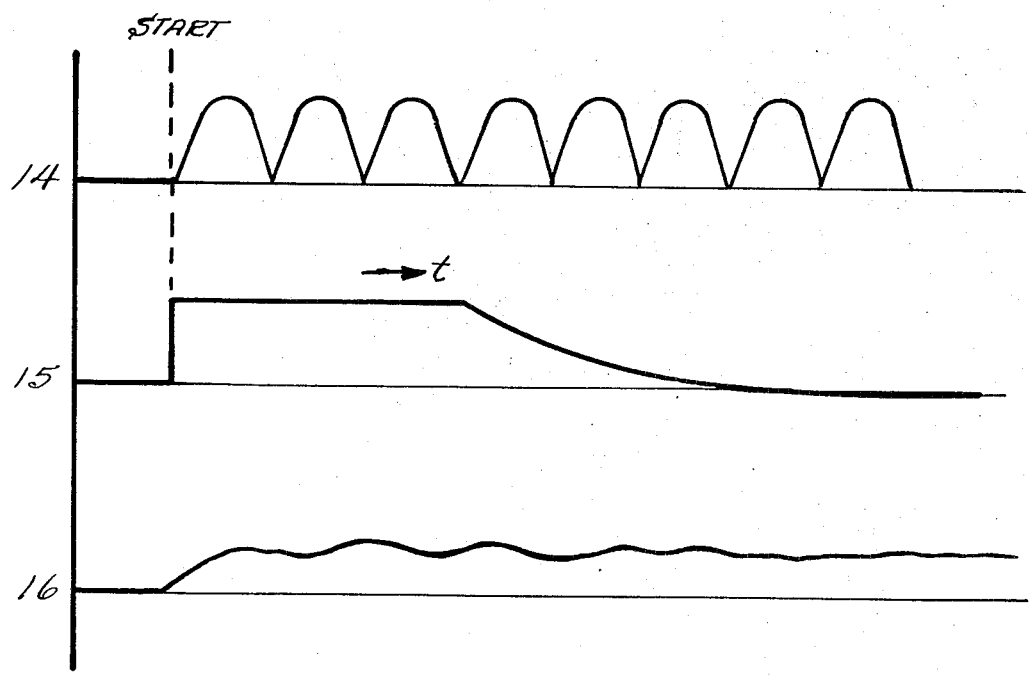
FIG. 2 shows characteristic voltages of a device as per the invention.

FIG. 2 shows the voltage variation 14 at the output of a controlled rectifier of a component beginning with the starting command of the machine. The voltage variation 15 is the pulse width ratio of the pulse width modulator 24 over the time cycle of the machine. From the starting command on, the pulse width modulator will first produce a voltage that will make a constant positive output voltage at the pulse width modulator 24 available during several cycles. After several runs only, the pulse duty factor — preferably exponentially — should decrease more and more until becoming infinite after a predetermined time so that when the machine has completed a certain number of runs, i.e. after a certain time, the pulse width modulator 24 will change over to a constant negative voltage.

By the duration of connection of resistor 6, 7 in FIG. 1 or 3, the time constant of the integration module is continuously extended. In FIG. 2, the voltage variation 16 shows the voltage present at the integration and storage capacitors 8, 9 of FIGS. 1 and/or 3.

It is obvious that after cutting-in the machine, the capacitor will be charged, indeed after several runs already, but due to some residual waves it will superpose on the controlled rectifier. Only after some additional runs and by extending the measuring time, these residual waves will be completely smoothed until reaching full storage.

Figure 5:
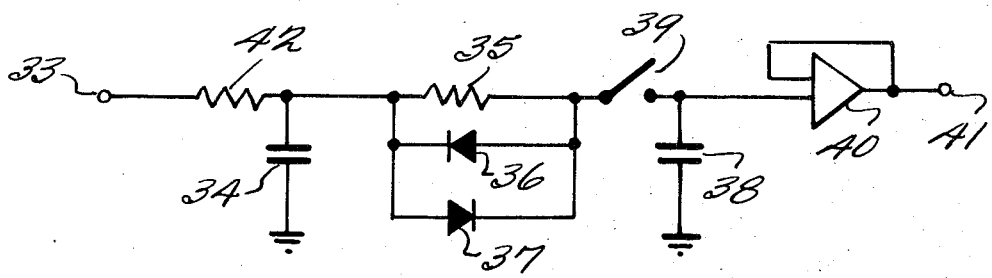
FIG. 5 shows a further embodiment according to the invention using a second integration module with a non-linear resistor for the purpose of shortening the measuring time.

FIG. 5 shows another embodiment according to the invention, wherein the output voltage of the controlled rectification for instance of a component at terminal 33 is fed to capacitor 34 via resistor 42. By this integration, the component voltage is roughly filtered. On cutting-in the machine, contact 39 is closed so that one of diodes 36 or 37, depending on their polarity, is low-resistive until capacitor 38 reaches nearly the same voltage as capacitor 34. Only then the two diodes 36 and 37 become high-resistive and the residual waves on capacitor 38 will be completely smoothed by means of the high-resistive capacitor 35. An impedance transducer 40 will transmit the voltage stored to an output terminal 41.

Many changes and modifications of the above-described embodiments of the invention can, of course, be carried out without departing from the spirit of this invention. Accordingly, the scope of this invention is intended to be limited only by the scope of the appended claims.

What is claimed is:

1. In a method for determining the imbalance of a rotary test body according to the amount and phase position, whereby the imbalance vector is split up into rectified voltage components by a vector splitting circuit and residual waves or interference frequencies are eliminated by subsequent integration by an integration circuit, the integration time being extended with increasing measuring time, the improvement comprising alternately connecting and disconnecting said vector splitting circuit and said integration circuit by a logic means that increases the time of disconnecting relative to the time of connecting with increasing measuring time.

2. In a method as in claim 1, the further improvement wherein said logic means connects and disconnects at a higher frequency than that of machine speed.

3. Apparatus for determining the imbalance amount and phase position of a test body rotating on a balancing machine having means for generating an imbalance vector electrical signal, comprising:
   means for splitting a received imbalance vector signal into components,
   an integrator connected to the output of said splitting means, logic means connected between said splitting means and said integrator, and having at least a conductive and non-conductive condition and control means connected to said logic means for rendering said logic means alternately conductive and non-conductive at a higher frequency than that of the machine speed, whereby the times of non-conduction relative to the time of conduction increase with increasing time.

4. Apparatus as in claim 3 where said logic means is a controlled field-effect transistor.

5. Apparatus as in claim 3 wherein said control means includes a pulse width modulator, the pulse duty factor of which operates exponentially.

6. Apparatus as in claim 4, wherein said control means further includes a capacitor for setting of the pulse duty factor of the pulse width modulator at the input of the pulse width modulator and switch means for connecting said capacitor to the pulse width modulator with the starting command of the balancing machine, said capacitor charged to a higher voltage than the pulse width modulator permits.

7. Apparatus as in claim 3 wherein said control means includes a resistor, a first diode connected in parallel with said resistor and a second diode connected in parallel with said resistor and connecting current in a direction opposite to said first diode.

* * * * *